March 31, 1942.  E. W. CARROLL  2,277,903
MEANS FOR INSPECTING FRUIT FOR POSITION
Filed Nov. 29, 1940   3 Sheets-Sheet 1

INVENTOR,
ELLSWORTH W. CARROLL.
BY
Lippincott & Metcalf
ATTORNEYS.

March 31, 1942.  E. W. CARROLL  2,277,903
MEANS FOR INSPECTING FRUIT FOR POSITION
Filed Nov. 29, 1940  3 Sheets-Sheet 2
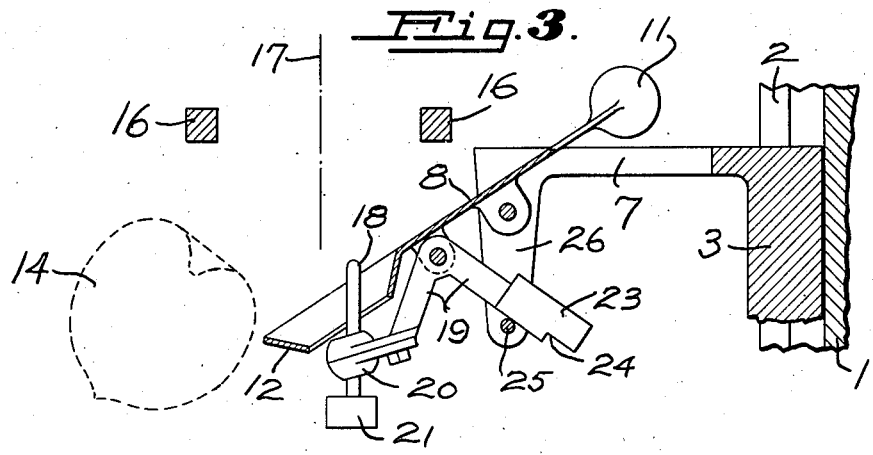
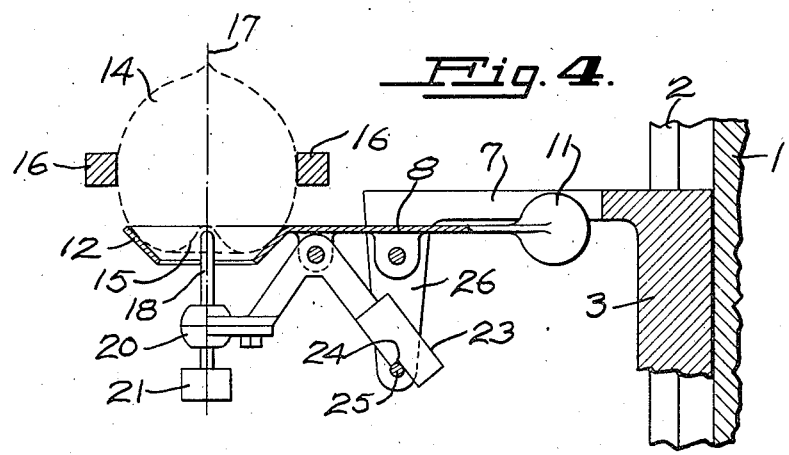
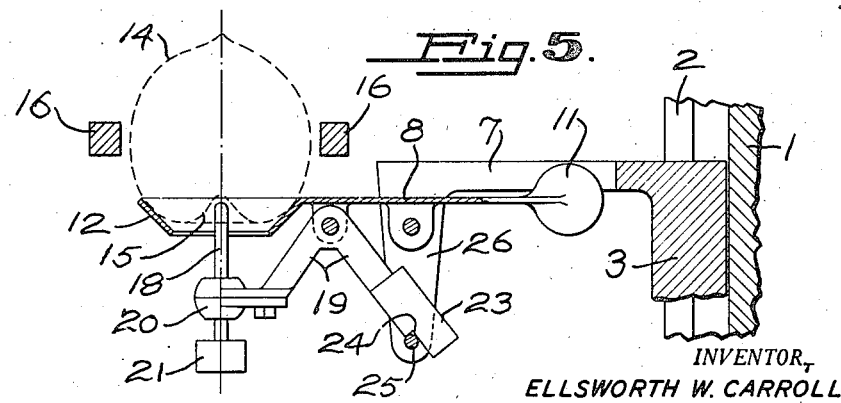
INVENTOR,
ELLSWORTH W. CARROLL.
BY
*Lippincott & Metcalf*
ATTORNEYS.

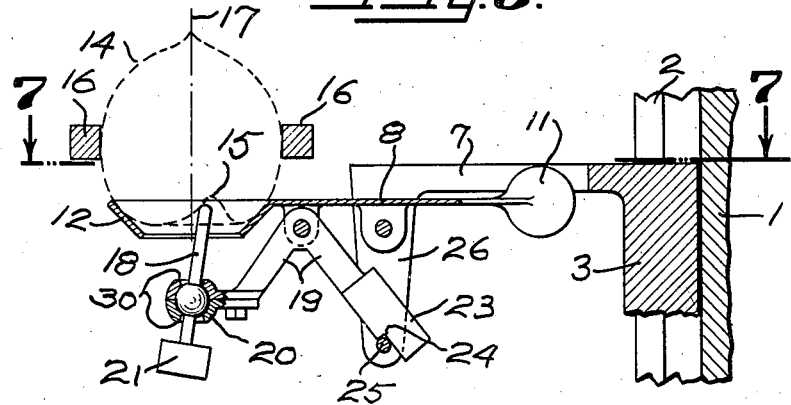
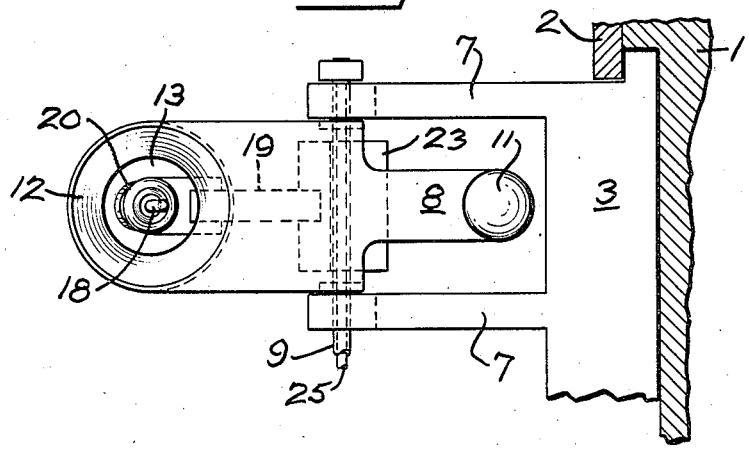
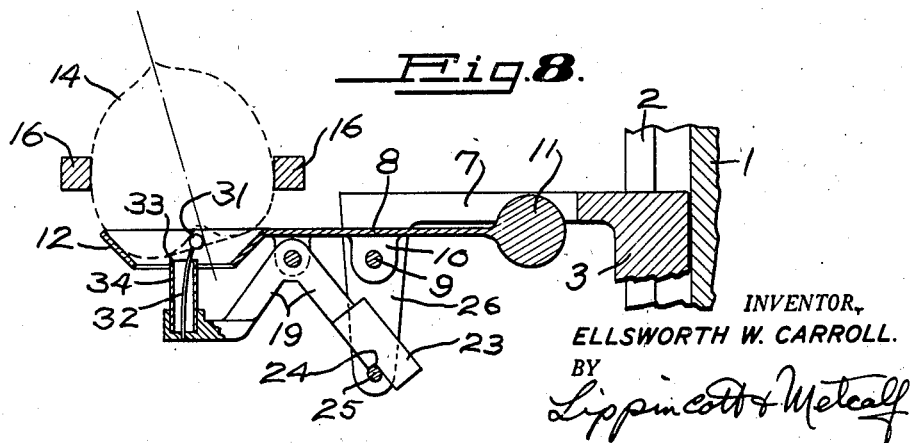

Patented Mar. 31, 1942

2,277,903

UNITED STATES PATENT OFFICE 2,277,903

MEANS FOR INSPECTING FRUIT FOR POSITION

Ellsworth W. Carroll, San Carlos, Calif., assignor to S & W Fine Foods, Inc., San Francisco, Calif., a corporation of California Application November 29, 1940, Serial No. 367,740

7 Claims. (Cl. 209—72)

My invention relates to means for inspecting fruit for stem indent position, and more particularly to a means for inspecting fruit after it has been subjected to an orientation operation, so that only properly orientated fruit may be pitted.

This application is an improvement on my application Serial No. 304,107, filed November 13, 1939, now Patent No. 2,232,208, dated February 18, 1941, which in turn is a division of my prior and co-pending application Serial No. 211,140, filed June 1, 1938, and entitled "Full automatic orientator."

In my prior application Serial No. 304,107, cited above, I have described and claimed a position inspector which is operative to reject fruit, after the fruit has been subjected to an orientation operation with respect to the stem indent, whose stem indents are not in the proper position. Such fruit as have the stem indent in the proper position are retained and thereafter carried to be pitted along a predetermined axis or plane, preferably a pitting axis which passes through the blossom end of the fruit, the pit and the stem indent of the fruit. The inspection device makes certain that all retained fruit will be pitted in exactly the same manner, and that the fruit, after pitting, will be uniform with regard to the pit removal apertures.

The basic principles upon which my prior application operated are embodied in my present device. The basic structure comprises a balance lever carrying at one end a fruit receptacle and at the other a counterweight. The balance lever is normally maintained and locked with the fruit receptacle generally horizontal, to receive a fruit deposited therein, and a locking lever controlling the balance lever is actuated by a pilot finger which extends through the bottom of the fruit receptacle to contact either the convex surface of the fruit, or to enter the stem indent of the fruit in accordance with the aspect of the fruit as deposited. If the pilot finger enters the stem indent of the fruit the balance lever remains locked and the fruit may thereafter be removed from the receptacle and passed to a pitting device. If however, the pilot finger contacts the convex surface of the fruit, thus indicating that the stem indent area is not in the proper position, the finger is pushed downwardly out of the receptacle thereby unlocking the balance lever. The weight of the fruit causes tilting of the balance lever with consequent dumping of the fruit. Such a mechanism is ideal for accurate inspection of the indent position of the fruit, and efficiently rejects all fruit whose stem indent is not in the exact proper position.

However, due to the fact that the inspecting finger, which projects into the receptacle, was made rigid, there was no tolerance in the inspection, and many fruit units whose stem indents were close to the proper position, but not exactly in the proper position, were rejected.

In the practical operation of commercial machines embodying my prior invention just above referred to, it is not necessary that stem indents be exactly orientated, and I have found that there may be considerable leeway in the position of the stem indent without affecting the quality of the pitted fruit output, so long as the stem indent is within a predetermined range of positions adjacent a central completely accurate position. Such a leeway in inspection however, cannot be accomplished with my former inspecting device, and the main object of the present invention is to provide a position inspector which will pass fruit whose stem indent is at or near the exact position, within a predetermined range of positions as desired. Another object of the present invention is to provide a position inspector in which the range of positions the stem indent may assume and passed as proper, may be accurately predetermined and controlled.

Other objects of my invention will be apparent or will be specifically pointed out in the description forming a part of this specification, but I do not limit myself to the exact embodiments of the invention herein described, as various forms may be adopted within the scope of the claims.

In the drawings:

Fig. 3 is a diagram showing the rejection of an improperly orientated peach.

Fig. 4 is a diagram showing the action of the inspector on a properly orientated peach.

Fig. 5 is a diagram showing the support of a properly orientated peach by the inspecting device.

Fig. 6 is a diagram showing the action of the inspector on a peach whose stem indent is out of exact position but within a predetermined range of positions.

Fig. 7 is a top view of the position inspector shown in Figs. 1–6.

Fig. 8 is a diagram of a modification of my invention.

Figure 1:
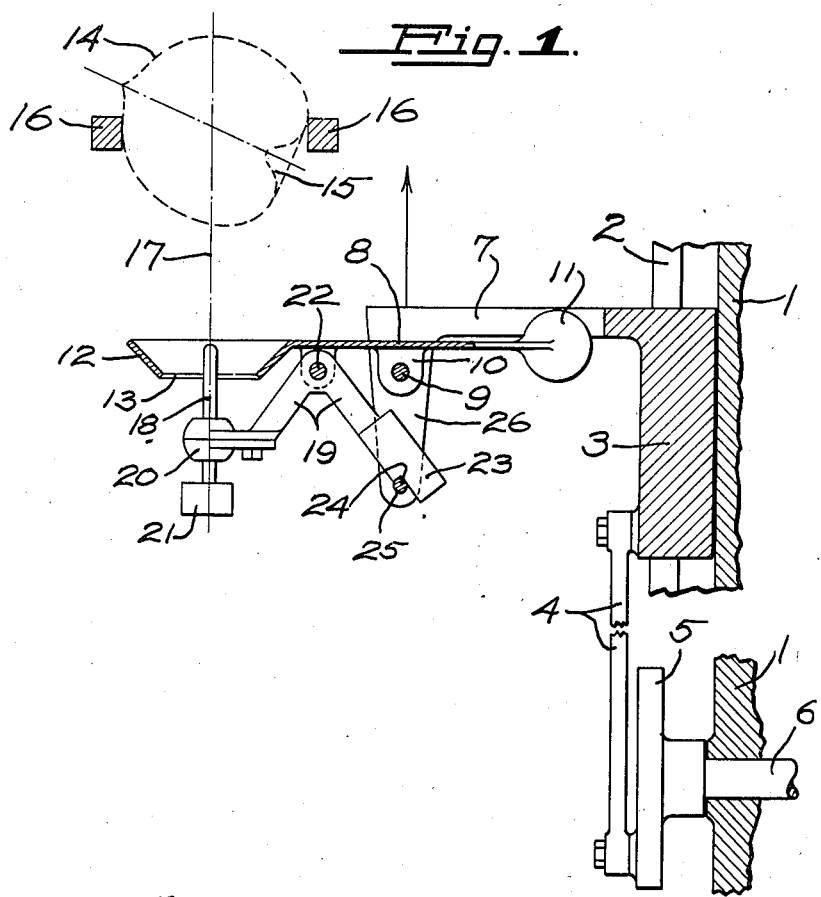
Fig. 1 is a diagrammatic view of the position inspector of my invention as applied to the inspection of previously orientated peaches.

Referring to the drawings for a more detailed description and the action thereof:

In Fig. 1 a frame 1 forming a part of a peach orientating and pitting machine for example, has attached thereto vertical guides 2 in which a slide 3 is reciprocated. This reciprocation is accomplished through a connecting rod 4 driven by a crank 5 attached to a rotating shaft 6. Slide 3 carries horizontally extending arms 7 thereon, between which is mounted a balance lever 8 on pivot pin 9 passing through downturned ears 10. One end of the balance lever 8 is provided with a counterweight 11, and the other end of the balance lever is provided with a fruit receptacle 12 having a bottom aperture 13. The fruit receptacle 12 is preferably coned, and of a size to receive a fruit such as a peach 14 as indicated by the broken line in the drawings. This peach has a stem indent 15 therein. The peaches are preferably carried by clamps formed by a pair of opposed clamp arms 16 which may be opened and closed to hold or release the fruit as more fully described in my above identified applications. The clamps may be progressed by an endless conveyor of any known type, past the receptacle 12 stopping with the peach 14 over the receptacle 12 in an inspecting station as indicated by the station axis line 17.

A locking lever 19 is provided carrying at one end a pilot finger 18. Pilot finger 18 is mounted in a ball and socket bearing 20, the pin 18 extending through the bearing 20 to terminate in a lower pin counterweight 21. Any similar structure that will allow pin 18 to move freely over a limited spherical arc may be used, such as for example, gimbals, or similar universal joint. Counterweight 21 centers pin 18 when out of fruit contact. Locking lever 19 is mounted on locking lever pivot 22 which is carried by balance lever 8 between receptacle 12 and ears 10. The other end of the locking lever 19 extends downwardly to terminate in a locking lever counterweight 23 having a lock notch 24 extending over lock pin 25 mounted on brackets 26 connected to arms 7. When in this position the locking lever solidly supports the receptacle 12. The upper end of the pilot finger 18 is free to move laterally within a predetermined spherical arc only, the extent of this spherical arc determining the leeway in inspection, as will be described later.

I will now describe the operation of the device on both improperly orientated fruit, and properly orientated fruit.

In Fig. 1, I have shown peach 14 in an improperly orientated position, the proper orientated position being with the stem indent 15 down. Slide 3 has been moved downwardly, thus bringing the entire inspecting mechanism out of the way of peach 14 and clamp arms 16, as the clamps and fruit are progressed, thereby allowing the fruit to be progressed to inspecting station 17, where the fruit is stopped directly over receptacle 12. Shaft 6, which drives slide 3 is interlinked to act in timely relation to the conveyor, as is well known in the art.

Figure 2:
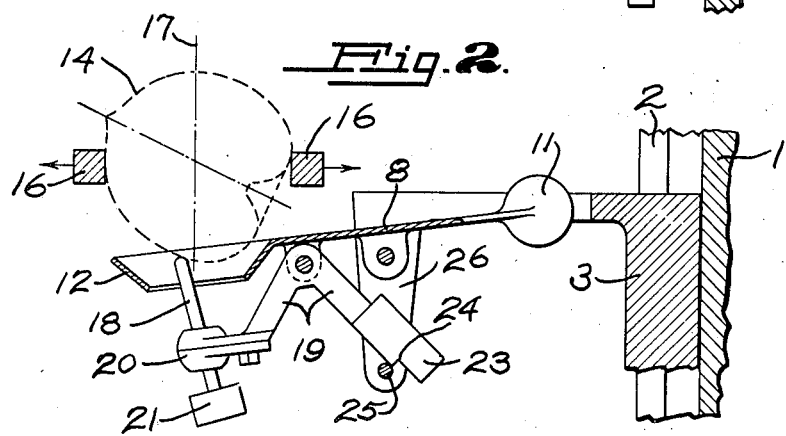
Fig. 2 is a diagram showing initial action of the inspector on an improperly orientated peach.

In Fig. 1 I have shown the peach stationary and ready for inspection. Shaft 6 is rotated so that slide 3 and the entire inspection mechanism is brought to its uppermost position as shown in Fig. 2. In this case the first thing that happens is that the inspecting finger 18 centered by counterweight 21 first contacts the convex surface of the fruit and may move laterally to the extent of allowed arc of movement. Finger 18 thereafter pushes its end of the locking lever 19 downwardly, and in doing so moves notch 24 away from lock pin 25, the peach 14 still being held by clamp arms 16. Sometimes pin 18 may contact the fruit surface squarely and move lever 19 downwardly at once to unlock the balance lever. Clamp arms 16 are then opened, as shown in Fig. 3, and the support of the peach transferred wholly to the inspecting mechanism. However, the inspecting mechanism is now unlocked due to the previous motion of the locking lever and the weight of the peach causes the receptacle end of the balance lever to drop down until the peach 14 rolls off the receptacle into a discard chute. The inspecting mechanism, being relieved of the weight of the peach, then moves back under the influence of counterweights 11 and 23 to restore the mechanism to the original locked position as shown in Fig. 1, ready for the presentation thereto of another peach, and slide 3, with the attached inspecting mechanism, is then moved downwardly to provide for the movement of the next peach to a position over the receptacle.

In Fig. 4 I have shown the peach 14 as being in exactly the proper aspect, with the slide 3 and its attached inspection mechanism at the top of the stroke. In this position, the finger 18 freely enters the stem indent of the fruit, and the locking lever remains in position to support the balance lever, so that when the clamp arms 16 are opened, as shown in Fig. 5, the peach rests stably in receptacle 12. When clamp arms 16 close again, they close on the properly orientated fruit which is then moved to a pitting station, after slide 3 and its attached inspection mechanism has moved downwardly out of the way.

The condition shown in Fig. 5, where the stem indent is accurately centered with relation to the vertical axis of the receptacle 12, is exactly the same as occurs in the device described and claimed in the above cited applications. However, in Fig. 6 I have shown the condititon of my improved inspecting device when a fruit is presented to the inspector which has the stem indent malformed and off-center, but where the indent is near enough to the proper position so that pitting may be accomplished without loss of quality. In this case, when the slide 3 is moved upwardly, the inspecting finger 18 first contacts a sloping side of the stem indent and moves laterally as the finger enters the stem indent. However, this lateral motion is within the range of lateral motion as predetermined by edges 30 of the ball and socket joint 20, and does not impose downward stress on the locking lever 19 sufficient to move the lever from its locking engagement with lock pin 25. Therefore peach 14 in Fig. 6, which has the stem indent off-center, but in nearly accurate position, is not discarded, as it normally would be if a rigid finger 18 were to be used, as was used in my prior device.

While I have shown the malformed peach in Fig. 6 as having a generally vertical axis passing through the blossom end of the pit and a portion of the stem indent, I wish it to be understood that the device operates in the same manner when a normal stem indent is presented to finger 18 within the predetermined range, with the pitting axis of the fruit off the vertical. Normal fruit will be retained to be pitted whose stem indents are presented to finger 18 within a predetermined range of position around the exact desired position of the stem indent. Thus I am able to provide a predetermined leeway of inspection with my present device which was not obtainable with my former device, and this leeway may be made as small or as large as desired, in accordance with the closeness of inspection required for proper pitting.

In Fig. 8 I have shown a modification of my invention where an inspecting tip 31 is mounted on a flexible wire 32. The lower end of this wire is solidly attached to the end of locking lever 19. In this case the leeway of inspection is controlled by the position of upper edges 33 of a cylinder 34 which surrounds wire 32, so that the rod may flex only until it touches edges 33. The diameter of the cylinder and upper position of edges 33 may be changed as desired to control the leeway of inspection. In this case I have shown a normal fruit presented to the inspecting tip 31 with the pitting axis slightly off vertical. When tip 31 is presented to the off-centered stem indent, wire 32 will flex within its allowed range so that tip 31 rides up into the indent, without moving the locking lever. When however, a peach is presented to tip 31 with the stem indent completely out of position, tip 31 will first move laterally until the wire 32 touches edge 33. Thereafter downward pressure is exerted on locking lever 19, the balance lever is unlocked and the fruit is dumped.

Thus it can be seen that I have provided a fruit inspecting mechanism which provides an inspection leeway. This leeway is such that the inspection mechanism will allow for variations in the formation of a stem indent with relation to the general contour of the fruit, and which will pass to be pitted fruit which while not exactly orientated, have their stem indents within a predetermined range of positions.

I claim:

1. A fruit position inspector comprising, in combination, a frame, a balance lever pivoted on said frame, a fruit receptacle at one end of said lever, a lever lock, and trigger means movable in a predetermined direction by contact with a fruit in said receptacle and thereby unlocking said lever only when said fruit is placed in said receptacle with the stem indent thereof in other than within a predetermined range of positions, said fruit contacting portion being free to move in other directions to enter the stem indent when the latter is within said range without unlocking said lever.

2. A fruit position inspector comprising, in combination, a frame, a balance lever pivoted on said frame, a fruit receptacle at one end of said lever, a counterweight on the other end of said lever, a lock normally holding said lever in a horizontal position, means for depositing a fruit in said receptacle, and trigger means movable to unlock said lever to spill said fruit from said receptacle, and a fruit contacting tip connected to said trigger means and movable by contact with the sides of a stem indent without moving said trigger means to spill said fruit.

3. Apparatus in accordance with claim 3, wherein the counterweight is heavier than said receptacle and lighter than fruit deposited in said receptacle.

4. A fruit position inspector comprising, in combination, a frame, a balance lever pivoted on said frame, a fruit receptacle at one end of said lever, an inspecting finger pivoted on the receptacle arm of said lever and having one end thereof projecting into said receptacle, the other end normally bearing against said frame to support said receptacle in a substantially horizontal plane, said finger being movable in one direction by contact with said fruit to remove support by said frame, thereby spilling said fruit, and the tip of said finger being movable in other directions without removing support from said frame.

5. Apparatus in accordance with claim 4, wherein the end of said finger entering said receptacle is downwardly movable by contact with the convex surface of said fruit to remove support by said frame and laterally movable to enter stem indents angularly positioned on said fruit receptacle.

6. A fruit position inspector comprising, in combination, a frame, a balance lever pivoted on said frame, a fruit receptacle on one end of said lever, a locking lever pivoted on the receptacle arm of said balance lever, one end of said locking lever normally bearing against said frame to support said receptacle in a substantially horizontal plane, an inspecting finger mounted on the other end of said locking lever and projecting into said receptacle, said inspecting finger being laterally movable within a predetermined range without substantially moving said locking lever.

7. A fruit position inspector comprising, in combination, a frame, a balance lever pivoted on said frame, a fruit receptacle on one end of said lever, a locking lever pivoted on the receptacle arm of said balance lever, one end of said locking lever normally bearing against said frame to support said receptacle in a substantially horizontal plane, an inspecting finger mounted on the other end of said locking lever and projecting into said receptacle, said inspecting finger being laterally movable within a predetermined range while projecting into said receptacle without substantially moving said locking lever and thereafter downwardly movable with said locking lever.

ELLSWORTH W. CARROLL.